United States Patent [19]

Tokushima et al.

[11] Patent Number: 5,056,614
[45] Date of Patent: Oct. 15, 1991

[54] APPARATUS FOR CONTROLLING THE DISTRIBUTION OF DRIVE POWER FOR MOTOR VEHICLES

[75] Inventors: Shyoji Tokushima; Makoto Watanabe, both of Tochigi, Japan

[73] Assignee: Honda Giken Kogyo Kabushiki Kaisha, Tokyo, Japan

[21] Appl. No.: 514,448

[22] Filed: Apr. 25, 1990

[30] Foreign Application Priority Data

Apr. 26, 1989 [JP] Japan .................................. 1-107056
Apr. 26, 1989 [JP] Japan .................................. 1-107057
Apr. 26, 1989 [JP] Japan .................................. 1-107058

[51] Int. Cl.$^5$ .......................................... B60K 17/348
[52] U.S. Cl. .................... 180/248; 192/85 R
[58] Field of Search ........................ 180/233, 247, 248; 192/109 F, 85 R

[56] References Cited

U.S. PATENT DOCUMENTS 4,681,180 7/1987 Oyama et al. ..................... 180/248

FOREIGN PATENT DOCUMENTS

2217227A 10/1989 United Kingdom .

Primary Examiner—Mitchell J. Hill
Attorney, Agent, or Firm—Armstrong, Nikaido, Marmelstein, Kubovcik & Murray

[57] ABSTRACT

An apparatus for controlling the distribution of drive power in an all-wheel-drive motor vehicle which has main drive wheels, auxiliary drive wheels, and a drive power transmitting system for transmitting the drive power to the auxiliary drive wheels. The apparatus has a hydraulic pressure source, a hydraulic system, a hydraulic clutch disposed in the drive power transmitting system, which varies the drive power transmitted to the auxiliary drive wheels, depending on the hydraulic pressure supplied from the hydraulic pressure source to the hydraulic clutch through the hydraulic system, and a control system for controlling the ratio at which the drive power is distributed between the main and auxiliary drive wheels, through regulation of the hydraulic pressure supplied from the hydraulic pressure source to the hydraulic clutch. The apparatus further includes a failure detecting system for detecting a failure of the hydraulic system, and a hydraulic pressure lowering system for lowering the hydraulic pressure supplied from the hydraulic pressure source to the hydraulic clutch when a failure of the hydraulic system is detected by the failure detecting system.

15 Claims, 4 Drawing Sheets

APPARATUS FOR CONTROLLING THE DISTRIBUTION OF DRIVE POWER FOR MOTOR VEHICLES

BACKGROUND OF THE INVENTION

1. Field of the Invention

The present invention relates to an apparatus for controlling the distribution of drive power for motor vehicles, and more particularly to an apparatus for controlling the distribution of drive power for four-wheel-drive motor vehicles whose four wheels, i.e., main and auxiliary drive wheels, are drivable by the engine.

2. Description of the Relevant Art

Some recent motor vehicles such as four-wheel-drive motor vehicles whose front and rear wheels are drivable by the drive power from the engine incorporate an apparatus for controlling the ratio of distribution of the drive power to the front and rear wheels depending on the running conditions of the motor vehicle, so that the motor vehicle exhibits improved running performance.

One such motor vehicle with drivable front and rear wheels is known from Japanese Laid-Open Patent Publication No. 62(1987)-203826, for example. The disclosed motor vehicle has a transmission disposed between the front and rear wheels and operable by a hydraulic actuator for speed changing operation. The hydraulic pressure supplied to the hydraulic actuator is controlled by a control valve to vary the ratio at which the drive power from the engine is distributed between the front and rear wheels.

The speed reduction ratio, i.e., the drive power distribution ratio, between the front and rear wheels is controlled by the hydraulic actuator. Therefore, if the control valve for controlling the hydraulic pressure supplied to the hydraulic actuator or a hydraulic system between the control valve and a pump for supplying the hydraulic pressure to the actuator fails for some reason, then it is impossible to control the drive power distribution ratio.

SUMMARY OF THE INVENTION

In view of the aforesaid problems of the conventional drive power distribution control apparatus, it is an object of the present invention to provide a drive power distribution control apparatus which can smoothly control the distribution of drive power from the engine of a motor vehicle between main and auxiliary drive wheels and also smoothly control differential rotation of the left and right auxiliary drive wheels, even if a hydraulic system for controlling the drive power distribution fails or malfunctions.

According to the present invention, there is provided an apparatus for controlling the distribution of drive power in an all-wheel-drive motor vehicle which has main drive wheels, auxiliary drive wheels, and a drive power transmitting system for transmitting the drive power to the auxiliary drive wheels, the apparatus having a hydraulic pressure source, a hydraulic system, hydraulic clutch means disposed in the drive power transmitting system, for varying the drive power transmitted to the auxiliary drive wheels depending on the hydraulic pressure supplied from the hydraulic pressure source to the hydraulic clutch means through the hydraulic system, and means for controlling the ratio at which the drive power is distributed between the main and auxiliary drive wheels, through the regulation of the hydraulic pressure supplied from the hydraulic pressure source to the hydraulic clutch means. The apparatus further comprises failure detecting means for detecting a failure of the hydraulic system, and hydraulic pressure lowering means for lowering the hydraulic pressure supplied from the hydraulic pressure source to the hydraulic clutch means when a failure of the hydraulic system is detected by the failure detecting means.

The hydraulic pressure source comprises a reservoir tank for storing working oil, and pump means for discharging the working oil under pressure from the reservoir tank. The hydraulic pressure lowering means comprises means for returning the working oil, discharged under pressure from the pump means, together with the working oil, supplied under pressure from the pump means to the hydraulic clutch means, to the reservoir tank when a failure of the hydraulic system is detected by the failure detecting means.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
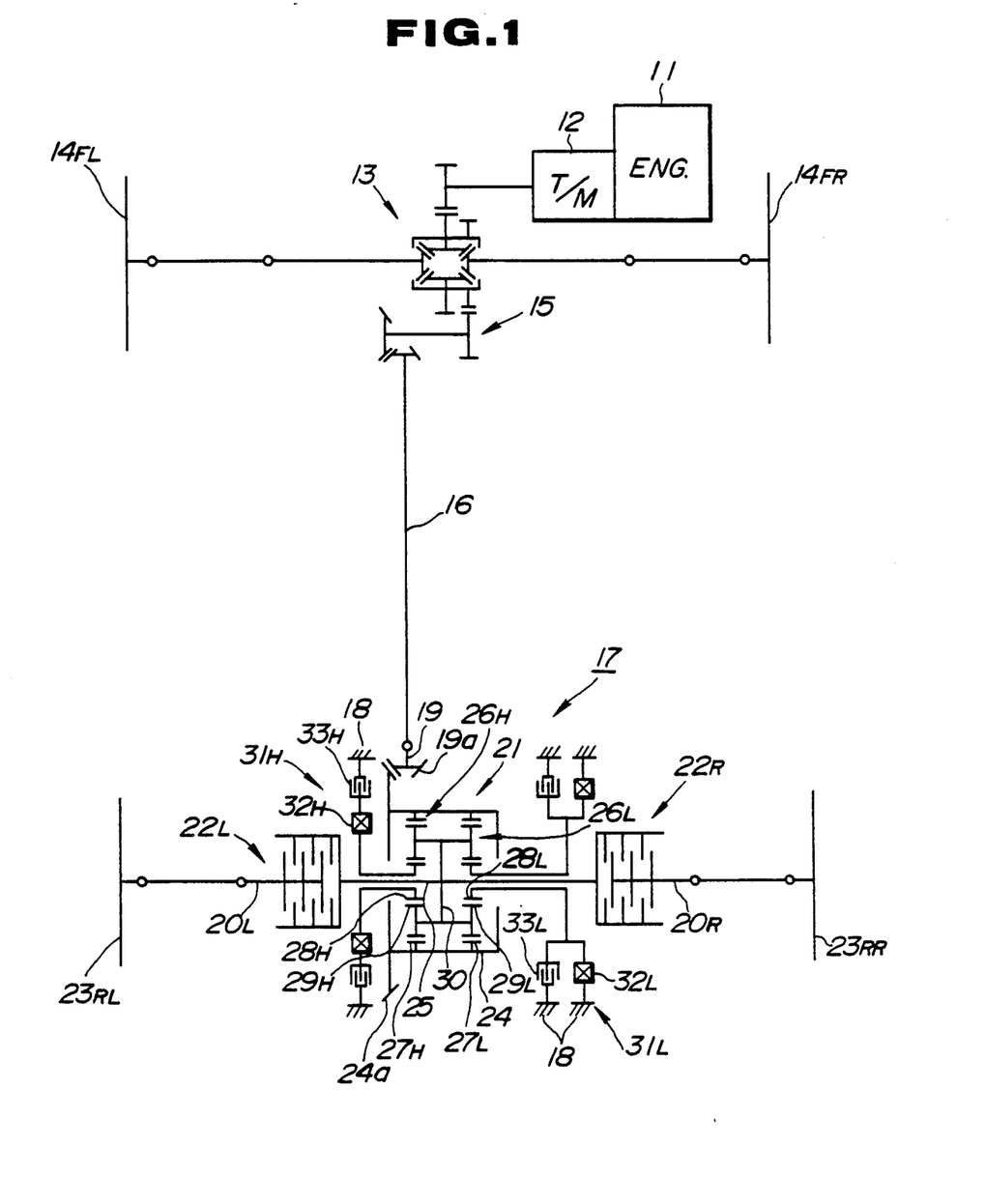
FIG. 1 is a schematic skeleton diagram of a drive power transmitting system in a motor vehicle having main and auxiliary drive wheels, the motor vehichle incorporating an apparatus for controlling the distribution of drive power according a preferred embodiment of the present invention.

FIG. 1 schematically shows a drive power transmitting system in a motor vehicle having main and auxiliary drive wheels, the motor vehicle incorporating an apparatus for controlling the distribution of drive power according a preferred embodiment of the present invention. The motor vehicle has an engine 11, a transmission 12 integrally coupled to the engine 11, a front differential 13 to which the output shaft of the transmission 12 is coupled, and a rear differential 17 operatively coupled to the front differential 13 through a gear mechanism 15 and a propeller shaft 16.

Left and right front wheels 14FL, 14FR are coupled to laterally opposite output shafts, respectively, of the front differential 15.

Figure 2:
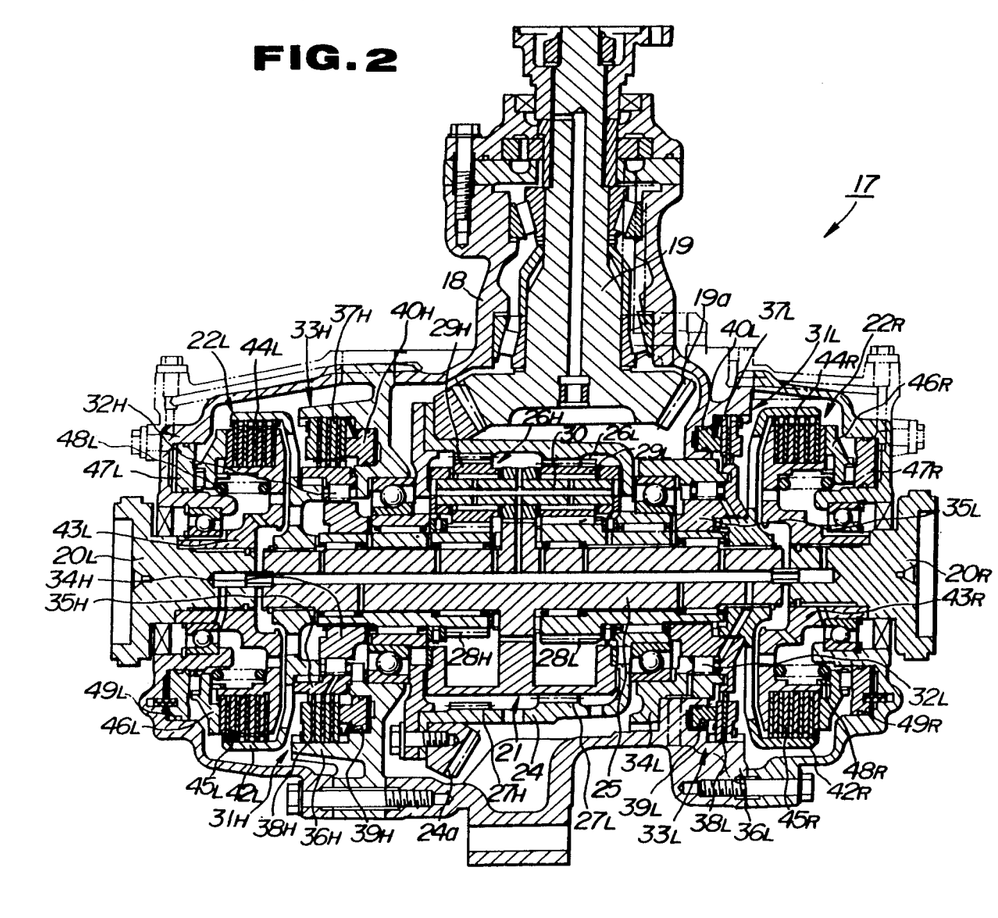
FIG. 2 is a detailed cross-sectional view of a portion of the drive power transmitting apparatus which is associated with the auxiliary drive wheels.

As shown in detail in FIG. 2, the rear differential 17 has a housing 18 having a front portion in which an input shaft 19 is rotatably supported and a pair of side portions in which output shafts 20L, 20R are rotatably supported, respectively. The housing 18 accommodates therein a transmission mechanism 21 and two hydraulic multiple-disc clutches 22L, 22R of the variable transmission capability type. The input shaft 19 has a front end coupled to the propeller shaft 16 through a joint, and a rear end having a bevel gear 19a. The output shafts 20L, 20R are operatively coupled to the transmission mechanism 21 through the respective hydraulic mutiple-disc clutches 22L, 22R. Laterally outer ends of the output shafts 20L, 20R are coupled to left and right rear wheels 23RL, 23RR, respectively, through axles.

The transmission mechanism 21 has a case 24 rotatably disposed in the housing 18. The bevel gear 19a of the input shaft 19 is held in mesh with a bevel gear 24a fixed to an outer peripheral wall of the case 24. Therefore, the front differential 13 and the engine 11 are operatively coupled to the case 24 in power transmitting relation. A main shaft 25 which extends transversely with respect to the motor vehicle is rotatably supported in the case 24. Two planetary gear assemblies 26H, 26L are disposed around the main shaft 25 in the case 24. The planetary gear assemblies 26H, 26L comprise respective ring gears 27H, 27L fixed to an inner wall surface of the case 24, respective sun gears 28H, 28L rotably mounted on the main shaft 25, and two sets of planet gears 29H, 29L disposed between and held in mesh with the ring gears 27H, 27R and the sun gears 28H, 28L. The planet gears 29H, 29L are supported on substantially tubular carriers 30, respectively. The sun gear 28H is engageable with the housing 18 through a lock clutch 31H, and the sun gear 28L is also engageable with the housing 18 through a lock clutch 31L. The carrier 30 has its inner peripheral central portion coupled by splines or the like to the main shaft 25 for rotation therewith. As described later on, when the sun gear 28H of the lefthand planetary gear assembly 26H (as shown in FIG. 2) is fixed, i.e., engages the housing 18, the ring gear 27H and the carrier 30 are coupled together at a speed reduction ratio for increasing the rotational speed of drive power which is transmitted from the ring gear 27H to the carrier 30 (the rotational speed of the front wheels 14FL, 14FR < the rotational speed of the rear wheels 23RL, 23RR). When the sun gear 28L of the righthand planetary gear assembly 26L is fixed, the ring gear 27L and the carrier 30 are coupled together (substantially directly coupled together) at a speed reduction ratio for substantially equalizing the rotational speed of the front wheels 14FL, 14FR and the rotational speed of the rear wheels 23RL, 23RR.

Figure 3:
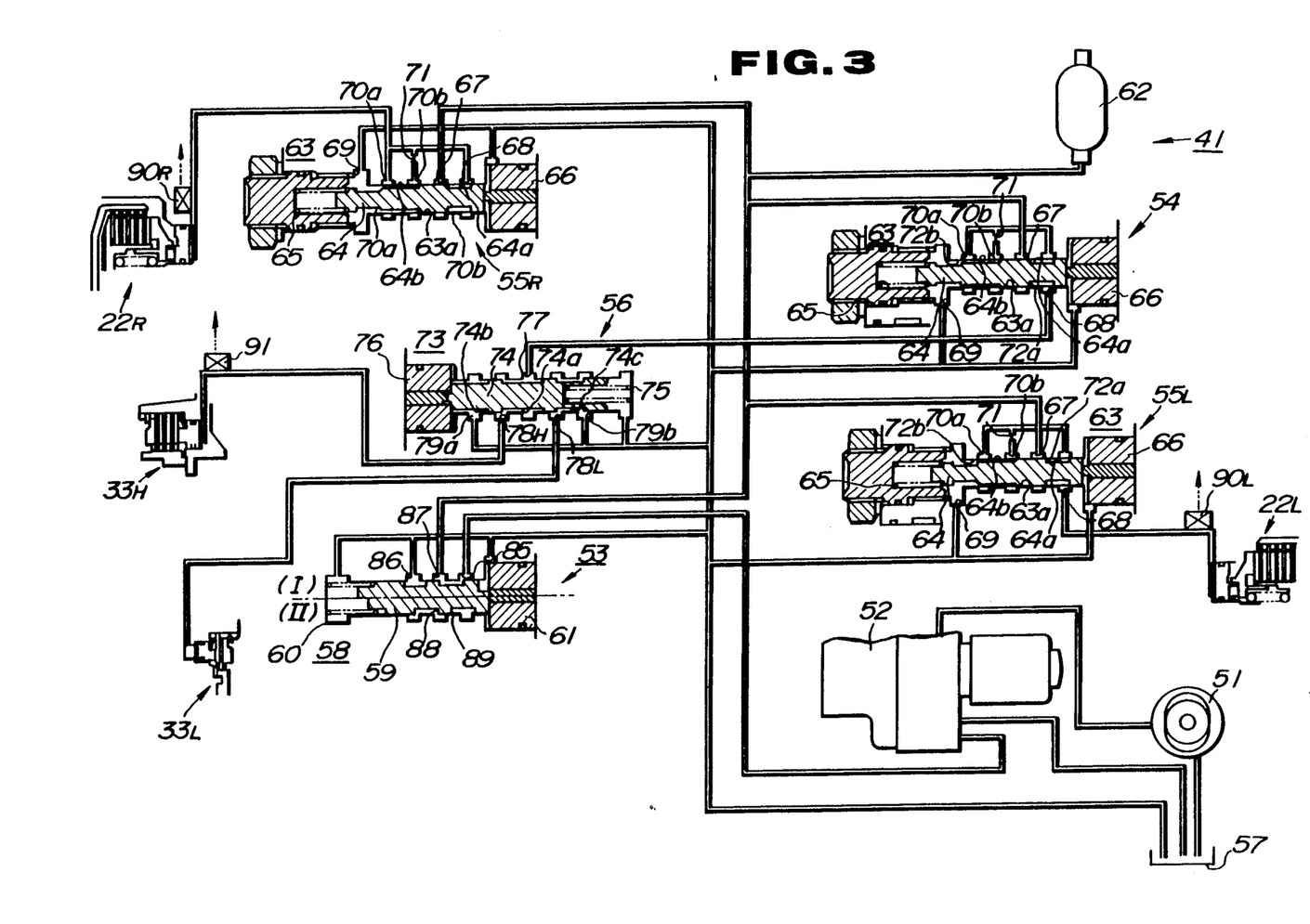
FIG. 3 is a circuit diagram of a hydraulic circuit of the apparatus for controlling the distribution of drive power.

The lefthand lock clutch 31H comprises a one-way clutch 32H and a hydraulic clutch 33H interposed in series between the sun gear 28H and the housing 18. The one-way clutch 32H is disposed between a tubular member 34H fixed to the sun gear 28H and a sleeve 35H of the hydraulic clutch 33H, and allows the tubular member 34H and the sleeve 35H to rotate relatively in only one direction. As described later on, when torque is transmitted from the ring gear 27H to the carrier 30, i.e., when drive power is applied to the rear wheels 23RL, 23RR, the one-way clutch 32H secures the tubular member 34H and the sleeve 35H to each other for thereby prohibiting relative rotation of the sleeve 35H and the sun gear 28H. The hydraulic clutch 33H comprises a plurality of plates 37H supported by splines or the like on the inner peripheral surface of a drum 36H integral with the housing 18, and a plurality of plates 38H supported by splines or the line on the outer peripheral surface of the sleeve 35H. The plates 37H, 38H are interleaved for axial frictional engagement. The hydraulic clutch 33H also includes a piston 40H slidably fitted in a cylinder bore 39H defined in the drum 36H. The piston 40H fitted in the cylinder bore 39H defines a hydraulic chamber in the cylinder bore 39H. The hydraulic chamber (also denoted at 39H) communicates with a hydraulic circuit 41 (FIG. 3). The piston 40H pushes the plates 37H, 38H into axial frictional engagement under a hydraulic pressure developed in the hydraulic chamber 39H. The hydraulic clutch 33H locks the sleeve 35H to the housing 18 depending on the force applied to the plates 37H, 38H by the piston 40H under the hydraulic pressure in the hydraulic chamber 39H.

The righthand lock clutch 31L comprises a one-way clutch 32L and a hydraulic clutch 33L interposed parallel between the outer periphery of the righthand end of the sun gear 28L and the housing 18. As with the one-way clutch 32H, the one-way clutch 32L is disposed between a sleeve 35L fixed to the outer periphery of the righthand end of the sun gear 28L and a tubular member 34L fixed to the inner wall surface of the housing 18, and prevent the sun gear 28L and the tubular member 34L from rotating relatively in one direction. When drive power is applied to the rear wheels 23RL, 23RR, the one-way clutch 32L secures the sun gear 28L to the housing 18 for thereby prohibiting rotation of the sun gear 28L. The hydraulic clutch 33L comprises a plurality of plates 37L coupled by splines or the like to a drum 36L integral with the housing 18, and a plurality of plates 38L coupled by splines or the line to the sleeve 35L. The plates 37L, 38L are interleaved for axial frictional engagement. The hydraulic clutch 33L also includes a piston 40L slidably fitted in a cylinder bore 39L defined in the drum 36L, the piston 40L serving to push the plates 37L, 38L into axial frictional engagement. The piston 40L fitted in the cylinder bore 39L defines a hydraulic chamber in the cylinder bore 39L. The hydraulic chamber (also denoted at 39L) communicates with the hydraulic circuit 41 (FIG. 3). The piston 40L pushes the plates 37L, 38L into axial frictional engagement under a hydraulic pressure developed in the hydraulic chamber 39L. When the plates 37L, 38L are pushed together by the piston 40L, the hydraulic clutch 33L locks the sun gear 28L to the housing 18 depending on the force applied to the plates 37L, 38L by the piston 40L under the hydraulic pressure in the hydraulic chamber 39L.

The lefthand hydraulic multiple-disc clutch 22L comprises a drum 42L fixedly mounted on the lefthand end of the main shaft 25 and a sleeve 43L fixedly mounted on the output shaft 20L. The clutch 22L also has a plurality of plates 44L splined or otherwise fixed to the inner periphery of the drum 42L, and a plurality of plates 45L splined or otherwise fixed to the outer periphery of the sleeve 43L, the plates 44L, 45L being interleaved for axial frictional engagement. A piston 47L is disposed for pressing engagement with the plates 44L, 45L through a presser 46L. Between the presser 46 and the sleeve 43L, there is disposed under compression a return spring 48L for normally biasing the presser 46L in a direction to release the plates 44L, 45L into spaced apart relationship. The piston 47L is slidably fitted in a cylinder bore 49L defined in the housing 18, and defines a hydraulic chamber (also denoted by 49L) in the cylinder bore 49L. The piston 47L therefore presses the plates 44L, 45L into axial frictional engagement under on the force depending on the hydraulic pressure in the hydraulic chamber 49L. The hydraulic chamber 49L is supplied with hydraulic pressure from the hydraulic circuit 41 which communicates with the hydraulic chamber 49L. The hydraulic multiple-disc clutch 22L couples the main shaft 25 and the output shaft 20L to each other under the engaging force depending on the hydraulic pressure developed in the hydraulic chamber 49L.

The righthand hydraulic multiple-disc clutch 22R is of the same construction as that of the lefthand hydraulic mutliple-disc clutch 22L. Those components of the clutch 22R which are identical to those of the clutch 22L are denoted by identical reference numerals with a suffix R, and are not described in detail. When the hydraulic chamber 49R of the clutch 22R is supplied with hydraulic pressure from the hydraulic circuit 41, the clutch 22R coupled the main shaft 25 and the output shaft 20R to each other under the engaging force depending on the hydraulic pressure in the hydraulic chamber 49R.

As shown in FIG. 3, the hydraulic circuit 41 has a pump 51, an unloading pressure control valve 52, a fail-safe valve 53, three pressure regulating valves 54, 55L, 55R, and a shift valve 56. Oil under pressure which is discharged by the pump 51 is supplied through the unloading pressure control valve 52 and the fail-safe valve 53, and regulated in pressure by the pressure regulating valves 55L, 55R. The regulated hydraulic pressure is led into the hydraulic chambers 49L, 49R of the lefthand and righthand hydraulic multiple-disc clutches 22L, 22R. The oil from the pump 51 is also regulated in pressure by the pressure regulating valve 54, and the regulated hydraulic pressure is supplied alternatively to the hydraulic chambers 39H, 39L of the lefthand and righthand hydraulic clutches 33H, 33L. The pump 91 comprises a known vane pump, and is driven directly by the crankshaft of the engine 11 or an electric motor for discharging oil from a reservoir tank 57 under pressure. The unloading pressure control valve 52 returns oil under pressure to the reservoir tank 57 when the discharge pressure of the pump 51 is in excess of a predetermined pressure level.

The fail-safe valve 53 comprises a spool 59 slidably disposed in a housing 58. The spool 59 is normally urged axially in one direction under the force of a return spring 60 disposed under compression between one side of the housing 58 and the end of the spool 59. A solenoid 61 electrically connected to a controller (not shown) is fixed to the opposite side of the housing 58. The housing 58 has an inlet port 85, a drain port 86, and an outlet port 87 which are defined therein. The inlet port 85 is connected to the unloading pressure control valve 52, the drain port 86 to the reservoir tank 57, and the outlet port 87 to the three pressure regulating valves 54, 55L, 55R parallel to each other. The spool 59 has two grooves 88, 89 defined in a region corresponding to the ports 85, 86, 87. When the spool 59 is positioned in a position (I), which is shown at an upper half, the outlet port 87 communicates with the inlet port 85 through the groove 89. When the spool 59 is positioned in a position (II), which is shown at a lower half, the outlet port 87 communicates with the drain port 86 through the groove 88.

When the motor vehicle runs normally, the solenoid 61 is energized to shift the spool 59 into the position (I). When the hydraulic circuit 41 fails or malfunctions or when the engine 11 stops, the solenoid 61 is de-energized to shift spool 59 into the position (II). Although not shown, the fail-safe valve 53 is disposed closely to the pump 51, e.g., separately from but near the unloading pressure control valve 52 or integral with the unloading pressure control valve 52. An accumulator 62 is connected to the hydraulic circuit 41 for storing oil under pressure in the known fashion.

The pressure regulating valve 54 comprises a spool 64 slidably housed in a bore 63a defined in a housing 63. A return spring 65 for urging the spool 64 in one direction is disposed under compression between one side of the housing 63 and the end of the spool 64. A solenoid 66 for axially moving the spool 64 against the bias of the return spring 65 is disposed on the opposite side of the housing 63. The solenoid 66 is electrically connected to the controller. The housing 63 has an inlet port 76 connected to the fail-safe valve 53, an outlet port 68 connected to the shift valve 56, a drain port 69 connected to the reservoir tank 57, a first control port 70a communicating with the outlet port 68, and a second control port 70b communicating with the outlet port 68 through a restriction 71. The spool 64 has a groove 64a and a shallow spool 64b which defines a gap between the spool 64 and a peripheral wall of the bore 63a. The groove 64a provides a variable restriction 72a between the inlet port 67 and the outlet port 68, whereas the shallow groove 64b provides a variable restriction 72b between the control ports 70a, 70b and the drain port 69. When the solenoid 66 is energized, it urges the spool 64 to move axially under a force depending on the current supplied to the solenoid 66, thus varying the hydraulic resistances of the variable restrictions 72a, 72b in opposite directions to regulate the hydraulic pressure discharged from the outlet port 68. As described later on, the solenoid 66 is energized synchronously with shifting operation of the shift valve 56, so that the hydraulic pressure discharged from the outlet port 68 is reduced when the shift valve 56 is shifted.

The shift valve 56 comprises a spool 74 slidably disposed in a housing 73. A return spring 75 for urging the spool 74 in one direction is disposed under compression between one side of the housing 73 and the end of the spool 74. A solenoid 76 for axially moving the spool 74 against the bias of the return spring 75 is fixedly disposed on the opposite side of the housing 73. The solenoid 76 is electrically connected to the controller. The housing 73 has an inlet port 77 connected to the pressure regulating valve 54, an outlet port 78H connected to the lefthand hydraulic clutch 33H, an outlet port 78L connected to the righthand hydraulic clutch 33L, and two drain ports 79a, 79b connected to the reservoir tank 57. The spool 74 has grooves 74a, 74b, 74c by which the outlet ports 78H, 78L are brought into selective communication with the inlet port 77 or the drain ports 79a, 79b. When the solenoid 76 is energized by the controller, it urges the spool 74 to move axially against the bias of the return spring 75. When the solenoid 76 is de-energized (as shown), the inlet port 77 and the outlet port 78H communicate with each other and the drain port 79b and the outlet port 78L communicate with each other, introducing hydraulic pressure to the lefthand hydraulic clutch 33H. With the solenoid 76 energized, fluid communication is established between the inlet port 77 and the outlet port 78L and also between the outlet port 78H and the drain port 79a, thereby applying hydraulic pressure to the righthand hydraulic clutch 33L.

The pressure regulating valves 55L, 55R are of the same structure as that of the pressure regulating valve 54. The pressure regulating valve 55L has its outlet port 68 connected to the lefthand hydraulic multiple-disc clutch 22L, and regulates the hydraulic pressure supplied to the clutch 22L depending on a current which is supplied from the controller to the solenoid 66. Likewise, the pressure regulating valve 55R has its outlet port 68 connected to the righthand hydraulic multiple-disc clutch 22R, and supplies regulated hydraulic pressure to the clutch 22R. Those parts of the pressure regulating valves 55L, 55R which are identical to those of the pressure regulating valve 54 are designated by identical reference numerals, and will not be described in detail.

The hydraulic multiple-disc clutches 22L, 22R and the hydraulic clutch 33H are associated respectively with pressure sensors 90L, 90R, 91 which detect the hydraulic pressure in the hydraulic chambers 49L, 49R, 39H. These pressure sensors 90L, 90R, 91 are electrically connected to the controller. The pressure sensors 90L, 90R, 91 detect the hydraulic pressure in the hydraulic chambers 49L, 49R, 39H and apply detected signals to the controller. Although not shown, the controller comprises a computer, and various sensors such as a sensor for detecting turning conditions of the motor vehicle are also connected to the controller. As described above, the solenoid 61 of the fail-safe valve 53, the solenoids 66 of the pressure regulating valves 54, 55L, 55R, and the solenoid 76 of the shift valve 56 are connected to the controller. Based on detected output signals from the sensors which detect various conditions of the motor vehicle, the controller determines hydraulic pressure (target hydraulic pressures) to be supplied to the hydraulic chambers 49L, 49R, 39H and also determines a position (target shift position) to which the shift valve 56 is to be shifted. Then, based on the target hydraulic pressures and the target shift position, and also on the detected signals from the sensors 90L, 90R, 91, the controller energizes the solenoids 66 of the pressure regulating valves 54, 55L, 55R and the solenoid 76 of the shift valve 56 for controlling the ratio of distribution of the drive power between the front and rear wheels and also differential rotation between the left and right rear wheels 23RL, 23RR under feedback control. When the differences between the hydraulic pressures in the hydraulic chambers 49L, 49R, 39H and the target hydraulic pressures exceed a predetermined pressure level, then the controller regards such a pressure condition as a failure or malfunction, and de-energizes the solenoid 60 of the fail-safe valve 53 thus lowering the hydraulic pressure in the hydraulic system.

The pressure sensors 90L, 90R, 91 may be arranged to directly detect the hydraulic pressures from the outlet ports 68 of the pressure regulating valves 55L, 55R, 54 and the hydraulic pressure from the outlet port 78H of the shift valve 56.

The apparatus for controlling the distribution of drive power, shown in FIGS. 1 through 3, operates as follows:

The ratio at which the drive power from the engine 11 is distributed between the front wheels 14FL, 14FR and the rear wheels 23RL, 23RR is controlled when the engaging forces of the lefthand and righthand hydraulic multiple-disc clutches 22L, 22R are varied in unison with each other, and the ratio at which the drive power from the engine 11 is distributed between the left and right rear wheels 23RL, 23RR is adjusted, i.e., differential rotation between the rear wheels 23RL, 23RR is limited, when the ratio of the engaging forces of the lefthand and righthand hydraulic multiple-disc clutches 22L, 22R is varied. To this end, the hydraulic chambers 49L, 49R of the hydrauylic multiple-disc clutches 22L, 22R are supplied with hydraulic pressures which have been regulated by the pressure regulating valves 55L, 55R, respectively, depending on the steering angle of the motor vehicle, for example, for thereby improving the running performance of the motor vehicle.

The transmission mechanism 21 can vary the rotational speed of the drive power transmitted from the engine 11 to the rear wheels 23RL, 23RR. When the lefthand hydraulic clutch 33H is engaged, and insofar as the drive power is applied to the rear wheels 23RL, 23RR, the sun gear 28H is locked by the hydraulic clutch 33H and the one-way clutch 32H, causing the planetary gear assembly 26H to couple the rear wheels 23RL, 23RR to the front wheels 14FL, 14FR at a speed reduction ratio for increasing the rotational speed of the drive power transmitted to the rear wheels 23RL, 23RR (the rotational speed of the rear wheels 23RL, 23RR < the rotational speed of the front wheels 14FL, 14FR). When the righthand hydraulic clutch 33L is engaged, the sun gear 28L is locked by the hydraulic clutch 33L, causing the planetary gear assembly 26L to couple the rear wheels 23RL, 23RR directly to the front wheels 14FL, 14FR (the rotational speed of the rear wheels 23RL, 23RR = the rotational speed of the front wheels 14FL, 14FR). When both the hydraulic clutches 33H, 33L are disengaged, and insofar as the drive power is applied to the rear wheels 23RL, 23Rr, the sun gear 28L is locked by the one-way clutch 32L, coupling the rear wheels 23RL, 23RR directly to the front wheels 14FL, 14FR. Since the solenoids 66 of the pressure regulating valves 55L, 55R are energized by the controller with a current whose magnitude depends on the running conditions of the motor vehicle, the hydraulic chambers 49L, 49R of the hydraulic multiple-disc clutches 22L, 22R are supplied with hydraulic pressures which have been regulated by the pressure regulating valves 55L, 55R, respectively, depending on the running conditions of the motor vehicle. Therefore, the ratio at which the drive power is distributed between the front and rear wheels and differential rotation between the left and right rear wheels 23RL, 23RR are controlled depending on the running conditions of the motor vehicle. The solenoid 66 of the pressure regulating valve 54 is energized by the controller with a current whose magnitude depends on the running conditions of the motor vehicle, and the solenoid 76 of the shift valve 56 is also energized with a current depending on the running conditions of the motor vehicle. consequently, the hydraulic clutches 33H, 33L are selectively supplied with hydraulic pressures depending on the running conditions of the motor vehicle for controlling the rotational speed of the drive power transmitted to the rear wheels 23RL, 23RR, i.e., the speed reduction ratio of the power transmitting arrangement between the rear wheels 23RL, 23RR and the front wheels 14FL, 14FR.

The hydraulic pressure which has been regulated by the pressure regulating valve 54 is supplied seletively to the hydraulic chambers 29H, 29L of the hydraulic clutches 33H, 33L by the shift valve 56. The pressure regulating valve 54 and the shift valve 56 are controlled depending on the running conditions of the motor vehicle such as the braking or turning conditions. The pressure regulating valve 54 is also controlled such that when the shift valve 56 is shifted, the hydraulic pressure supplied to the shift valve 56 by the pressure regulating valve 54 is lowered. For example, when the motor vehicle makes a turn, the shift valve 56 supplies hydraulic pressure to the hydraulic clutch 33H to engage the same for rotating the rear wheels 23RL, 23RR at a speed higher than the front wheels 14FL, 14FR. When the motor vehicle is reversed or braked by engine brake, the shift valve 56 supplied hydraulic pressure to the hydraulic clutch 33L to engage the same for coupling the rear wheels 23RL, 23RR directly to the front wheels 14FL, 14FR (the speed reduction ratio between the front and rear wheels = 1). When the motor vehicle runs normally with the drive power transmitted from the engine 11 to the rear wheels 23RL, 23RR, the shift valve 56 provides communication between the hydraulic clutches 33H, 33L and the reservoir tank 57, causing the one-way clutch 32L to lock the sun gear 28L of the planetary gear assembly 26L, so that the rear wheels 23RL, 23RR are coupled directly to the front wheels 14FL, 14FR. When the motor vehicle is braked by the foot brake, the pressure regulating valve 54 returns the hydraulic pressure to the reservoir tank 57, thus disengaging the hydraulic clutches 33H, 33L. In synchronism with shifting operation of the shift valve 56, the pressure regulating valve 54 temporarily lowers the hydraulic pressure supplied to the shift valve 56. Therefore, the stability with which the motor vehicle runs straight ahead is not impaired. When the motor vehicle makes a turn, the rotational speed of the drive power transmitted to the rear wheels 23RL, 23RR is increased for high turning performance of the motor vehicle. When the motor vehicle is braked by the foot brake, the front and rear wheels are separated, and hence are prevented from being locked together. When the motor vehicle is braked by engine brake, it can be braked strongly, and any shift shock is reduced.

In this embodiment, the hydraulic pressure regulated by the pressure regulating valve 54 is supplied alternatively to the speed-increasing hydraulic clutch 33H or the direct-coupling hydraulic clutch 33L by the shift valve 56, for thereby varying the rotational speed of the drive power transmitted to the rear wheels 23RL, 23RR. Therefore, the engaging forces of the hydraulic clutches 33H, 33L can be adjusted by the pressure regulating valve 54. The shift valve 56 may be reduced in size as it is not required to have a neutral shift position. The mechanical components of the rear differential 17 are prevented from being damaged since the hydraulic pressure is not supplied simultaneously to the hydraulic clutches 33H, 33L. Any shift shock is reduced since the hydraulic pressure supplied to the shift valve 56 is lowered by the pressure regulating valve 54 when the shift valve 56 is shifted.

With the above apparatus for controlling the distribution of drive power, the fail-safe valve 53 is interposed between the unloading pressure control valve 52 and the pressure regulating valves 54, 55L, 55R. The oil under pressure discharged from the pump 51 is supplied to the pressure regulating valves 54, 55L, 55R through the fail-safe valve 53. When the hydraulic pressure supplied to the hydraulic multiple-disc clutches 22L, 22R or the hydraulic clutch 33H is of an abnormal level, the solenoid 61 is de-energized, thus shifting the spool 59 to the position (II). Now, the inlet ports 67 of the pressure regulating valves 54, 55L, 55R are brought into communication with the reservoir tank 57 through the drain port 86 of the fail-safe valve 53 to return the oil under pressure to the reservoir tank 57. In the event of a failure or malfunction, therefore, the hydraulic pressure in the hydraulic chambers 49L, 49R, 39H, 39L of the clutches 22L, 22R, 33H, 33L is lowered, so that these clutches 22L, 22R, 33H, 33L are disengaged. Consequently, the rear wheels 23RL, 23RR are disconnected from the front wheels 14FL, 14FR, and the motor vehicle runs in a two-wheel-drive mode in which only the front wheels 14FL, 14FR are driven by the engine 11. Even when the hydraulic circuit 41 suffers a failure or malfunction, the running performance of the motor vehicle is not unduly affected, and the motor vehicle is rendered highly safe while running. Inasmuch as the fail-safe valve 53 is disposed closely to the pump 51, any burden on the pump 51 is reduced when a failure or malfunction occurs.

Figure 4:
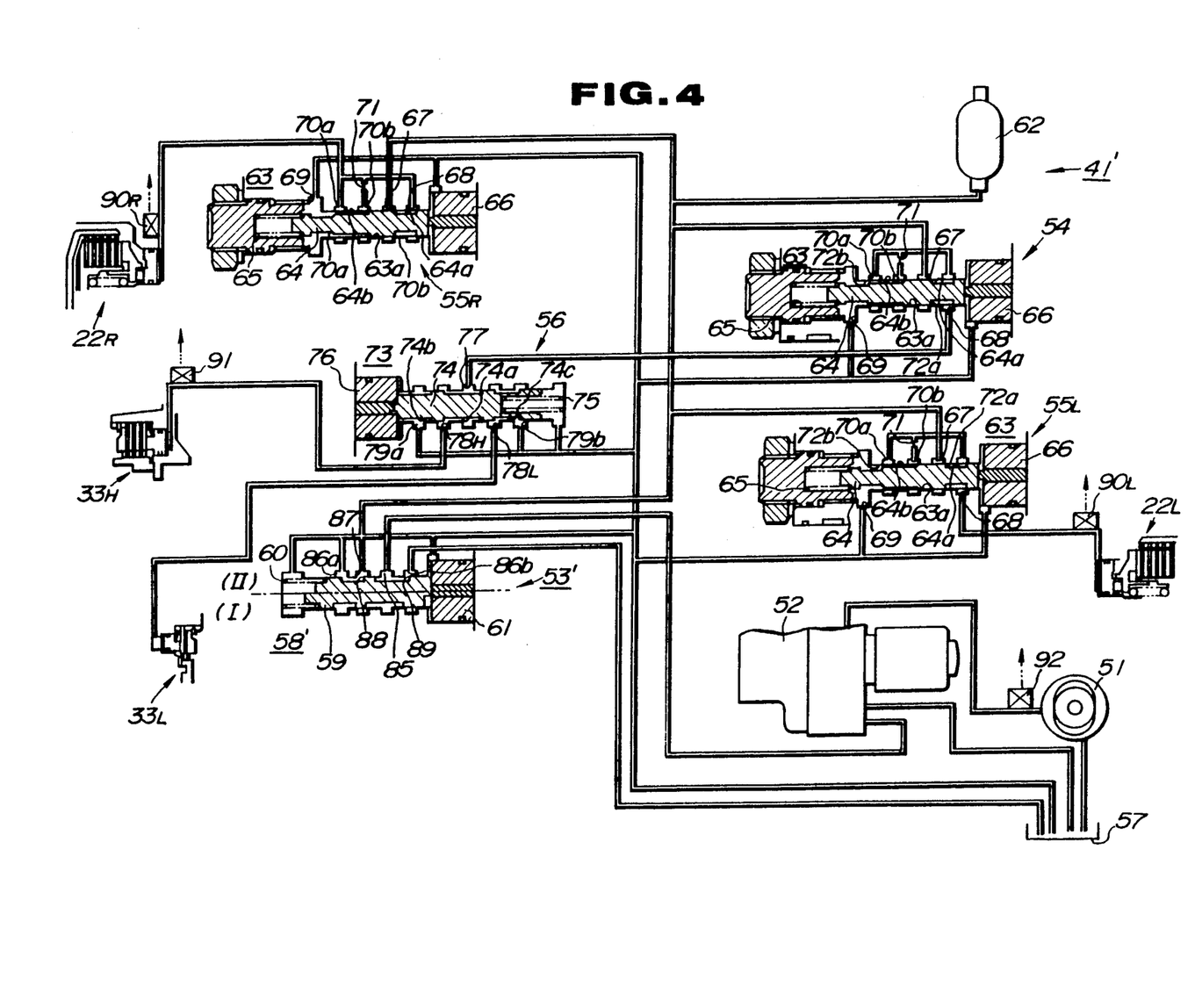
FIG. 4 is a circuit diagram of a modification of the hydraulic circuit shown in FIG. 3.

FIG. 4 shows a hydraulic circuit 41' which includes a fail-safe valve 53' that is a modification of the fail-safe valve 53 shown in FIG. 3. Unlike the fail-safe valve 53, the fail-safe valve 53' has a housing 58' which has two drain ports 86a, 86b communicating with the reservoir tank 57. When the fail-safe valve 53' is shifted to the position (I) shown at a lower half, the outlet port 87 communicates with the inlet port 85 through the groove 89. When the fail-safe valve 53' is shifted to the position (II) shown at an upper half, the outlet port 87 and the inlet port 85 communicate with the drain ports 86a, 86b, respectively, through the grooves 88, 89.

When the motor vehicle runs normally, the solenoid 61 of the fail-safe valve 53' is energized to shift the spool 59 to the position (I). When the hydraulic circuit 41' fails or malfunctions, or when the working oil is low in temperature while the motor vehicle is at rest, or when the engine 11 stalls, the solenoid 61 is de-energized to position the spool 59 in the position (I). Although not shown, the fail-safe pump 53' is positioned closely to the pump 51, i.e., separately from and near the unloading pressure control valve 52 or integral with the unloading pressure control valve 52.

The hydraulic circuit 41' additionally has an oil temperature sensor 92 disposed near the discharge port of the pump 51, as well as the pressure sensors 90L, 90R, 91 for detecting the hydraulic pressure in the hydraulic chambers 49L, 49R, 39H. The oil temperature sensor 92 sends a detected signal representing the temperture of the working oil to the controller, which is also supplied with detected sensors from various sensors. To the controller, there are also connected various other sensors such as a vehicle speed sensor for detecting the speed of the motor vehicle and a sensor for detecting a turning condition or the like of the motor vehicle. Based on the detected output signals from these sensors. the controller determines hydraulic pressures (target hydraulic pressures) to be supplied to the hydraulic chambers 39H, 49L, 49R and a target shift position to which the shift valve 56 is to be shifted. Then, based on the target hydraulic pressures and the target shift position and, also on the detected signals from the sensors, the controller energizes the solenoids 66 of the pressure regulating valves 54, 55L, 55R and the solenoid 76 of the shift valve 56 for controlling the ratio of distribution of the drive power between the front and rear wheels and also differential rotation between the left and right rear wheels 23RL, 23RR under feedback control. When the differences between the hydraulic pressures in the hydraulic chambers 49L, 49R, 39H and the target hydraulic pressures exceed a predetermined pressure level, then the controller regards such a pressure condition as a failure or malfunction, and de-energizes the solenoid 60 of the fail-safe valve 53'. Particularly, even when the vehicle speed detected by the vehicle speed sensor is lower than a predetermined speed and the oil temperature detected by the oil temperature sensor 92 is lower than a predetermined temperature, the controller de-energizes the solenoid 61 of the fail-safe valve 53'. The oil temperature sensor 92 may be positioned anywhere in the hydraulic circuit 41', rather than closely to the pump 51.

The drive power distribution control apparatus which incorporates the modified hydraulic circuit 41' also offers substantially the same advantages as those of the hydraulic circuit 41. In particular, when the hydraulic pressure supplied to the hydraulic multiple-disc clutches 22L, 22R or the hydraulic clutch 33H is of an abnormal level, the solenoid 61 of the fail-safe valve 53' is de-energized, and the spool 59 is shifted to the position (II) (FIG. 4), bringing the inlet ports 67 of the pressure regulating valves 54, 55L, 55R to the reservoir tank 57, and the oil under pressure which is discharged by the pump 51 is returned directly to the reservoir tank 57. In the event of a failure or malfunction, therefore, the hydraulic multiple-disc clutches 22L, 22R and the hydraulic clutches 33H, 33R are quickly disengaged, disconnecting the rear wheels 23RL, 23RR from the front wheels 14FL, 14FR, and the motor vehicle enters a two-wheel-drive mode in which only the front wheels 14FL, 14FR are driven by the engine 11. Even when the hydraulic circuit 41 suffers a failure or malfunction, the running performance of the motor vehicle is not unduly affected, and the motor vehicle is rendered highly safe while running.

When the temperature of the working oil in the hydraulic circuit 41' while the vehicle speed is lower than a predetermined temperature, e.g., when the engine is idling while the motor vehicle is at rest immediately after the engine has started in a cold climate, the solenoid 61 of the fail-safe valve 53' is not energized, and the spool 59 is in the position (II). Therefore, the inlet port 85 and the drain port 86a communicate with each other, and the outlet port 87 and the drain port 86b communicate with each other. The oil discharged under pressure from the pump 51 flows through the unloading pressure control valve 52 and the fail-safe valve 53' back to the reservoir tank 57. Thus, the oil under pressure circulates between the pump 51 and the reservoir tank 57. During such circulation, the temperature of the oil increases and the viscosity thereof decreases. Accordingly, when the ratio of distribution of drive power between the front and rear wheels or differential rotation between the rear wheels is controlled after the motor vehicle has started running, the hydraulic pressure can quickly be supplied to the hydraulic multiple-disc clutches 22L, 22R for a quick control response. The hydraulic circuit 41' is composed of a small number of parts and can be manufactured inexpensively since the fail-safe valve 53' is also used to increase the temperature of the working oil.

With the hydraulic circuit 41', the oil discharged under pressure from the pump 51 is circulated in its entirety when the vehicle speed and the oil temperature are low. However, only part of the working oil may be circulated depending on the vehicle speed or the oil temperature. Alternatively, insofar as the vehicle speed is lower than a predetermined speed, the working oil may be circulated for a certain period of time after the engine has started, irrespective of the oil temperature.

In the above embodiments, whether the hydraulic circuit has failed or not is determined according to the difference between the detected actual hydraulic pressure in the hydraulic circuit and the target hydraulic pressure to be achieved. However, a hydraulic circuit failure may be determined by the length of the time for which the difference between the actual and target hydraulic pressures, or the magnitude of the current supplied to the solenoids.

With the drive power distribution control apparatus according to the present invention, as described above, when the hydraulic circuit or system fails or malfunctions, the hydraulic pressure supplied to the hydraulic clutches is lowered to enable the motor vehicle to enter the two-wheel-drive mode in which only the front or rear wheels are driven by the engine.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. In an apparatus for controlling the distribution of drive power in an all-wheel-drive motor vehicle which has main drive wheels, auxiliary drive wheels, and a drive power transmitting system for transmitting the drive power to the auxiliary drive wheels, said apparatus having a hydraulic pressure source, a hydraulic system, hydraulic clutch means disposed in the drive power transmitting system, for varying the drive power transmitted to the auxiliary drive wheels depending on the hydraulic pressure supplied from the hydraulic pressure source to the hydraulic clutch means through the hydraulic system, and means for controlling the ratio at which the drive power is distributed between the main and auxiliary drive wheels, through regulation of the hydraulic pressure supplied from the hydraulic pressure source to the hydraulic clutch means, the improvement comprising:

failure detecting means for detecting a failure of the hydraulic system; and hydraulic pressure lowering means for lowering the hydraulic pressure supplied from the hydraulic pressure source to the hydraulic clutch means when a failure of the hydraulic system is detected by said failure detecting means.

2. An apparatus according to claim 1, wherein said hydraulic pressure source comprises:

a reservoir tank for storing working oil; and pump means for discharging the working oil under pressure from said reservoir tank;

said hydraulic pressure lowering means comprising means for returning the working oil, supplied under pressure from said pump means to said hydraulic clutch means, to said reservoir tank when a failure of the hydraulic system is detected by said failure detecting means.

3. An apparatus according to claim 2, wherein said hydraulic pressure lowering means comprises means for returning the working oil, discharged under pressure from said pump means, together with said working oil, supplied under pressure from said pump means to said hydraulic clutch means, to said reservoir tank when a failure of the hydraulic system is detected by said failure detecting means.

4. An apparatus according to claim 3, wherein said hydraulic pressure lowering means is disposed between said pump means and said hydraulic clutch means and positioned as closely to said pump means as possible.

5. An apparatus according to claim 1, further comprising:

target hydraulic pressure determining means or determining a target hydraulic pressure depending on a condition of the motor vehicle; and pressure regulating means disposed in the hydraulic system between said hydraulic pressure lowering means and said hydraulic clutch means, for regulating the hydraulic pressure, to be supplied to said hydraulic clutch means, up to the target hydraulic pressure which is determined by said target hydraulic pressure determining means;

said failure detecting means comprising means for detecting a failure of the hydraulic system when the difference between the actual hydraulic pressure supplied from said pressure regulating means to said hydraulic clutch means and the target hydraulic pressure determined by said target hydraulic pressure determining means is in excess of a predetermined pressure.

6. An apparatus according to claim 1, further comprising:

a transmission mechanism having a plurality of elements to be selectively controlled, for varying the rotational speed of the drive power transmitted to the auxiliary drive wheels;

pressure regulating means for regulating the hydraulic pressure generated by said hydraulic pressure source;

said hydraulic clutch means comprising a plurality of hydraulic clutches for selectively controlling said elements of said transmission mechanism depending on the hydraulic pressure supplied from said pressure regulating means; and selective supply means selectively operable to supply the hydraulic pressure regulated by said regulating means to one of said hydraulic clutches.

7. An apparatus according to claim 6, wherein said pressure regulating means comprises means for temporarily lowering the hydraulic pressures to be supplied to said selective supply means, in synchronism with selective operation of said selective supply means.

8. An apparatus according to claim 6, wherein said hydraulic pressure source comprises:

a reservoir tank for storing working oil; and pump means for discharging the working oil under pressure from said reservoir tank;

said hydraulic pressure lowering means being disposed between said pressure regulating means and said hydraulic pressure source, said hydraulic pressure lowering means comprising means for returning the working oil, discharged under pressure from said pump means, together with the working oil, supplied under pressure from said pump means to said hydraulic clutch means, directly to said reservoir tank when a failure of the hydraulic system is detected by said failure detecting means.

9. An apparatus according to claim 6, wherein said transmission mechanism comprises a plurality of planetary gear assemblies each having a ring gear and a sun gear, each of said elements comprising one of said ring gear and said sun gear of one of said planetary gear assemblies.

10. An apparatus according to claim 1, wherein said hydraulic pressure source comprises:

a reservoir tank for storing working oil; and pump means for discharging the working oil under pressure from said reservoir tank;

said failure detecting means comprising vehicle speed detecting means for detecting the speed of the motor vehicle, and oil temperature detecting means for detecting the temperature of oil in said hydraulic system;

said failure detecting means further comprising means for detecting a failure of the hydraulic system when the vehicle speed detected by said vehicle speed detecting means is lower than a predetermined vehicle speed and the temperature of the working oil detected by said oil temperature detecting means is lower than a predetermined temperature.

11. An apparatus according to claim 10, wherein said hydraulic pressure lowering means comprises means for circulating the working oil discharged under pressure from said pump means, between said pump means and said reservoir tank to increase the temperature of the working oil after a failure of the hydraulic system is detected by said failure detecting means.

12. An apparatus according to claim 10, further comprising:

target hydraulic pressure determining means or determining a target hydraulic pressure depending on a condition of the motor vehicle; and pressure regulating means disposed in the hydraulic system between said hydraulic pressure lowering means and said hydraulic clutch means, for regulating the hydraulic pressure, to be supplied to said hydraulic clutch means, up to the target hydraulic pressure which is determined by said target hydraulic pressure determining means;

said failure detecting means comprising means for detecting a failure of the hydraulic system when the difference between the actual hydraulic pressure supplied from said pressure regulating means to said hydraulic clutch means and the target hydraulic pressure determined by said target hydraulic pressure determining means is in excess of a predetermined pressure;

said hydraulic pressure lowering means comprising means for circulating the working oil discharged under pressure from said pump means, between said pump means and said reservoir tank, and for returning the working oil supplied under pressure from said pump means to said hydraulic clutch means, to said reservoir tank.

13. In an apparatus for controlling the distribution of drive power in a rear-wheel-drive motor vehicle having left and right rear wheels and drive power transmitting systems for transmitting the drive power to the left and right rear wheels, respectively, said apparatus having a hydraulic pressure source, a hydraulic system, hydraulic clutch means disposed respectively in the drive power transmitting systems, for varying the torques transmitted to the rear wheels depending on the hydraulic pressures supplied from the hydraulic pressure source to the hydraulic clutch means through the hydraulic system, and means for controlling the ratio at which the drive power is distributed between the left and right rear wheels, through regulation of the hydraulic pressures supplied from the hydraulic pressure source to the hydraulic clutch means, the improvement comprising:

failure detecting means for detecting a failure of the hydraulic system; and hydraulic pressure lowering means for lowering the hydraulic pressures supplied to said hydraulic clutch means when a failure of the hydraulic system is detected by said failure detecting means.

14. In an apparatus for controlling the distribution of drive power in an all-wheel-drive motor vehicle having main drive wheels, auxiliary drive wheels, and a drive power transmitting system for transmitting the drive power to the auxiliary drive wheels, said apparatus having a hydraulic pressure source, a hydraulic system, hydraulic clutch means disposed in the drive power transmitting system, for varying the torque transmitted to the auxiliary drive wheels depending on the hydraulic pressure supplied from the hydraulic pressure source to the hydraulic clutch means through the hydraulic system, and means for controlling the ratio at which the drive power is distributed between the main and auxiliary drive wheels, through regulation of the hydraulic pressure supplied from the hydraulic pressure source to the hydraulic clutch means, characterised in that:

said hydraulic clutch means comprises left and right hydraulic multiple-disc clutches disposed in drive power transmitting systems connected to left and right auxiliary drive wheels, for controlling the distribution of the drive power between the left and right auxiliary drive wheels depending on the hydraulic pressure, as regulated, supplied from said hydraulic pressure source through said hydraulic system;

said apparatus further comprising:

failure detecting means for detecting a failure of the hydraulic system which supplies the hydraulic pressure from said hydraulic pressure source to said hydraulic multiple-disc clutches; and hydraulic pressure lowering means for lowering the hydraulic pressure supplied from the hydraulic pressure source to the hydraulic multiple-disc clutches when a failure of the hydraulic system is detected by said failure detecting means.

15. In an apparatus for controlling the distribution of drive power in an all-wheel-drive motor vehicle having main drive wheels, auxiliary drive wheels, and a drive power transmitting system for transmitting the drive power to the auxiliary drive wheels, said apparatus having a hydraulic pressure supply mechanism, a hydraulic actuator mechanism for varying the torque transmitted to the auxiliary drive wheels depending on the hydraulic pressure supplied from the hydraulic pressure supply mechanism to the hydraulic actuator mechanism, and means for controlling the ratio at which the drive power is distributed between the main and auxiliary drive wheels, through regulation of the hydraulic pressure supplied from the hydraulic pressure supply mechanism to the hydraulic actuator mechanism, characterized in that:

said hydraulic actuator mechanism comprises:

left and right first hydraulic clutch means disposed in drive power transmitting systems coupled to left and right auxiliary drive wheels, for controlling the distribution of the drive power between the left and right auxiliary drive wheels depending on the hydraulic pressure supplied from said hydraulic pressure supply mechanism;

speed-increasing means for increasing the rotational speed of the drive power transmitted to said auxiliary drive wheels and transmitting the drive power with the increased rotational speed to said first hydraulic clutch means; and second hydraulic clutch means for actuating said speed-increasing means to increase the rotational speed of the drive power;

said hydraulic pressure supply mechanism comprising:

a hydraulic pressure source;

a hydraulic system for supplying the hydraulic pressure, as regulated, from said hydraulic pressure source to the hydraulic clutch means of said hydraulic actuator mechanism;

failure detecting means for detecting a failure of said hydraulic system; and hydraulic pressure lowering means for lowering the hydraulic pressure supplied from the hydraulic pressure source to said hydraulic actuator mechanism when a failure of the hydraulic system is detected by said failure detecting means.

* * * * *